US005828029A

United States Patent [19]

Loubet et al.

[11] Patent Number: 5,828,029

[45] Date of Patent: Oct. 27, 1998

[54] DEVICE FOR EXTERNALLY COOLING A PLASMA TORCH

[75] Inventors: Daniel Loubet, Saint Aubin de Medoc; René Leroux, Merignac, both of France

[73] Assignee: Aerospatiale Societe Nationale Industrielle, Paris Cedex, France

[21] Appl. No.: 665,904

[22] Filed: Jun. 19, 1996

[30] Foreign Application Priority Data

Jun. 20, 1995 [FR] France .................................. 95 07610

[51] Int. Cl.[6] ...................................................... B23K 10/00

[52] U.S. Cl. ................................ 219/121.49; 219/121.48; 219/121.36; 219/121.37

[58] Field of Search ......................... 219/121.36, 121.38, 219/121.37, 121.48, 121.49, 121.52, 121.53, 74, 75; 373/18–22

[56] References Cited

U.S. PATENT DOCUMENTS

| | | | |
|---|---|---|---|
| 3,130,292 | 4/1964 | Gage et al. | 219/121.49 |
| 3,194,941 | 7/1965 | Baird | 219/121.49 |
| 4,710,607 | 12/1987 | Wilhelmi et al. | 219/121.49 |
| 5,206,481 | 4/1993 | Rossner et al. | 219/121.48 |
| 5,210,392 | 5/1993 | Labrot et al. | 219/121.52 |

FOREIGN PATENT DOCUMENTS

| | | |
|---|---|---|
| 0427592 | 5/1991 | European Pat. Off. . |
| 2651185 | 5/1978 | Germany . |

*Primary Examiner*—Mark H. Paschall
*Attorney, Agent, or Firm*—Young & Thompson

[57] ABSTRACT

The invention concerns a device for externally cooling a plasma torch. The invention concerns a device for cooling a plasma torch in which the electrode(s) and plasma fluid and cooling circuits are housed in a tubular casing, wherein the cooling device includes an independent sheath surrounding at least one main portion of the tubular casing and formed of two concentric casings, at least one cooling fluid inlet and at least one outlet disposed at the proximal extremity of the sheath, a system of baffles being disposed between the two casings of the sheath so as to constitute between the inlet and outlet a cooling circuit substantially covering the entire surface of the sheath, the inlet and outlet being connected to a suitable cooling fluid source.

19 Claims, 6 Drawing Sheets

DEVICE FOR EXTERNALLY COOLING A PLASMA TORCH

BACKGROUND OF THE INVENTION

1. Field of the Invention

The present invention relates to plasma torches and more specifically plasma torches to be introduced into vitrification ladles or ovens heated to high temperatures possibly reaching 2000° C.

2. Discussion of Background

Plasma torches are used in industry for various purposes and especially for rendering waste inert, for example.

One of the major problems concerning plasma torches is the lifetime of the electrodes which need to be cooled because of firstly the extremely high temperatures of the arc plasma generated by the torch, and secondly the temperatures of the confined medium in which at least the nose of the torch is likely to be located, this being the case with furnaces or vitrification ladles.

That is the reason why recently designed plasma torches comprise a cooling circuit for externally cooling at least one portion of the downstream electrode, which to a certain degree protects the nose of the torch, especially when the latter is partially introduced into an oven.

However, this cooling is inadequate in certain cases when it would be useful to introduce inside the furnace a longer length of the tubular portion, so-called bare torch, where the electrodes are disposed.

In fact, the cooling of the downstream electrode is only effected on one portion of the external face and the general design of the torch does not allow this cooling on the external face of the upstream electrode.

SUMMARY OF THE INVENTION

The precise aim of the invention involves a device able to cool ore effectively and fully these torches, thus enabling them to be more reliably resistant to high-temperature environments, such as those encountered in ovens or vitrification ladles.

Generally speaking, the invention is applicable to all types of plasma torches, namely non-transferred arc torches of the type mentioned above and comprising two electrodes, namely one upstream and one downstream electrode, and transferred arc torches comprising only one electrode, the other electrode being outside the torch.

With this aim in mind, the invention involves to produce a device for externally cooling a plasma torch of the type in which the electrode(s) and the plasma fluid and cooling circuits are housed in a tubular casing, wherein the invention comprises an independent sheath surrounding at least one major portion of said tubular casing and formed of two concentric casings, at least one inlet and at least one outlet for the cooling fluid disposed at the proximal extremity of said sheath, a baffle system being fitted between the two casings of the sheath to constitute between the inlet and outlet a cooling circuit significantly covering the entire surface of the sheath, said inlet and outlet being connected to a suitable cooling fluid source.

According to one application of the invention where a torch is to be introduced into an opening of the passage of an oven wall or the like and comprising a flange cooperating with a holding device surrounding said passage opening, said sheath comprises at its proximal extremity a flange cooperating also with said holding device and fitted with passages for the cooling fluid of the sheath to enter and leave.

Moreover, the cooling fluid inlet is preferably connected to the cooling fluid outlet of the torch, whereas the outlet is connected to the return of the external system for regenerating the cooling fluid of the torch.

The baffle system between the two concentric casings of the sheath is for example, formed of internal spacer partitions parallel to the axis of the sheath so as to define for the cooling fluid a path including a plurality of return elements parallel to said axis and over the entire length of the sheath.

According to an embodiment of said baffle system, inlet and outlet of the fluid are diametrically disposed and the fluid path is divided into two symmetrical portions each covering a half-sheath.

The device of the invention effectively cools the torch as concerns the bare torch portion and without having to intervene on the torch structure, this cooling subsequently enabling the entire bare torch to be introduced into the oven without risking damage.

Other characteristics and advantages shall appear more readily from a reading of the following description of one embodiment of the device of the invention, this description being given solely by way of example.

DESCRIPTION OF THE PREFERRED EMBODIMENT

Figure 1:
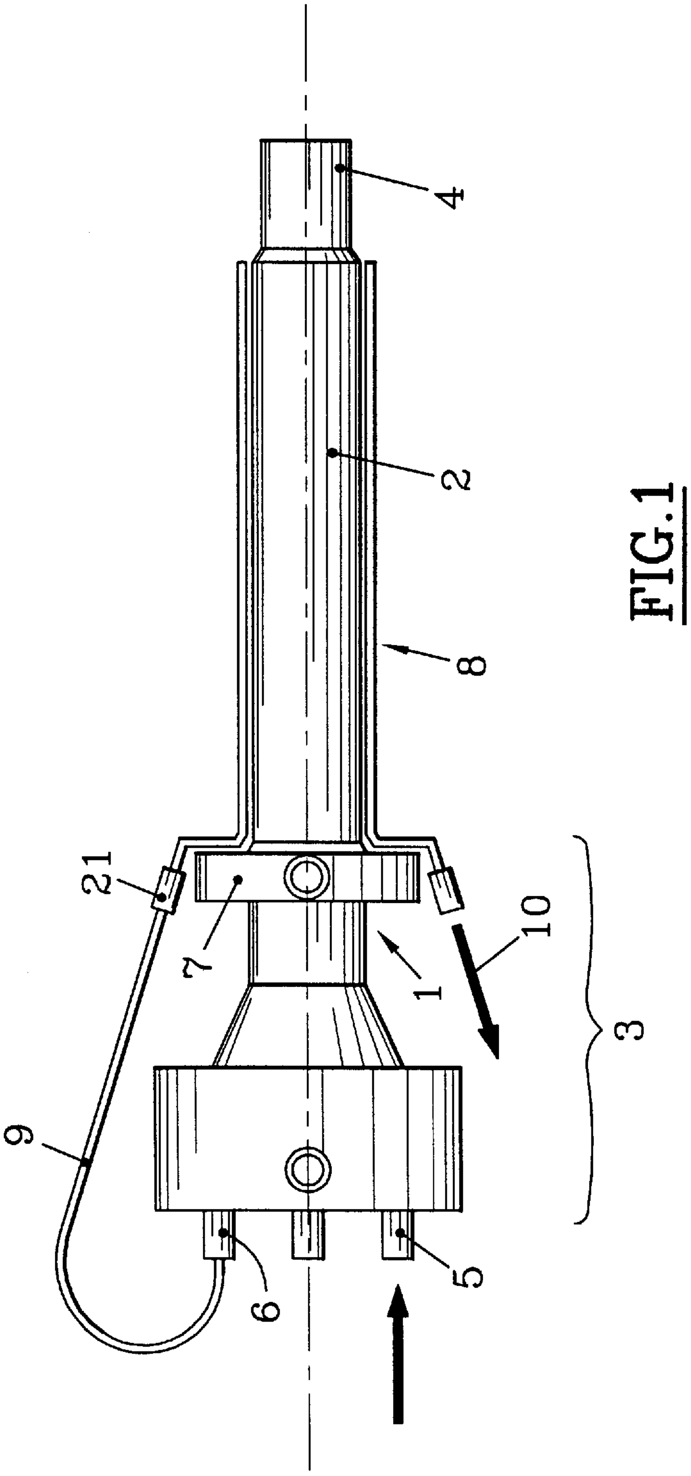
FIG. 1 is a diagrammatic view showing the principle of the invention.

FIG. 1 shows diagrammatically at 1 a non-transferred arc type plasma torch including, housed in a cylindrical casing 2, a set of the upstream and downstream electrodes, a plasma gas injection system and various fluid circuits, this portion being currently designated as a bare torch.

Disposed at the rear of the tubular portion 2 is the connection system 3, namely various systems for routing fluids, electric current and torch command and control system.

The nose 4 of the torch has a slightly reduced diameter and corresponds to one portion where the downstream portion of the outer face of the electrode is partially cooled by the cooling circuit of the torch.

The circuit uses, for example, demineralized water and comprises a water inlet or intake 5 at the rear portion of the connection system 3, as well as an outlet 6.

Figure 2:
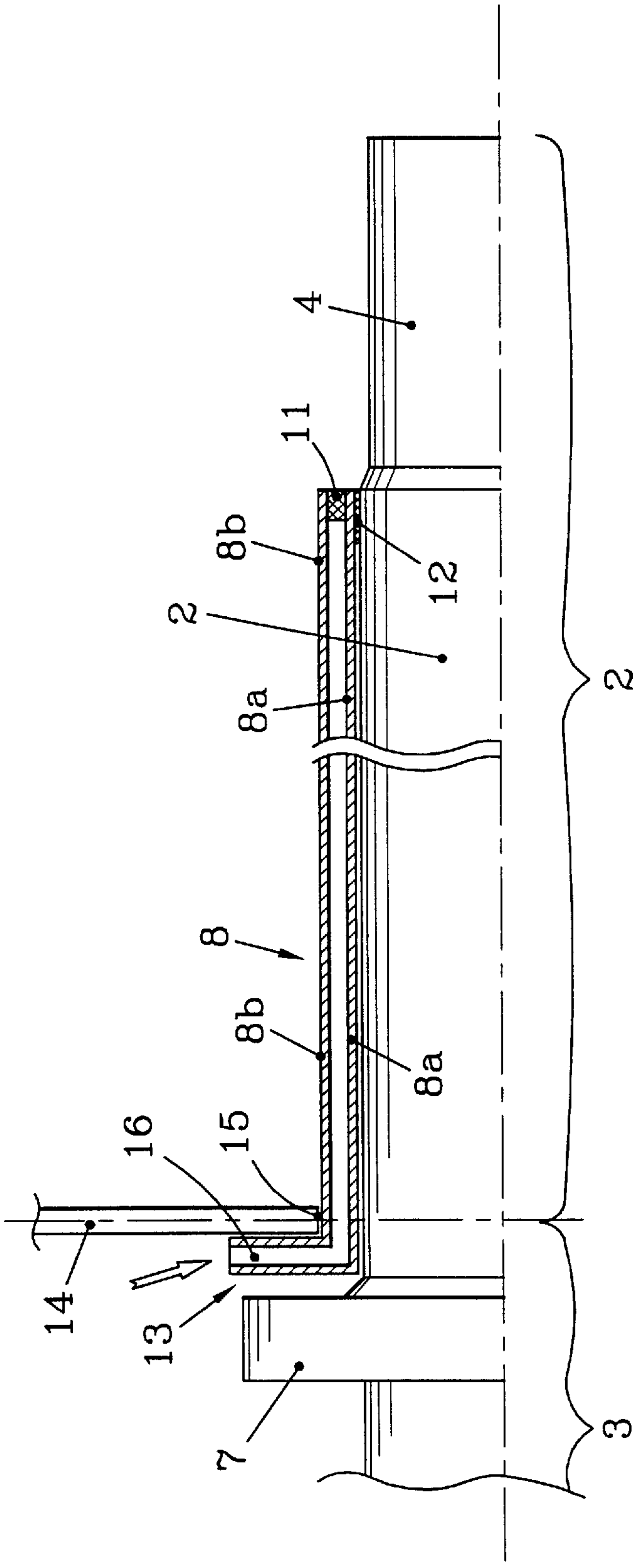
FIG. 2 is a partial half-view of the plasma torch of the type shown in FIG. 1 and provided with a cooling sheath according to the invention and positioned in an opening of an oven wall.

At the height of the joining point between the tubular portion 2 of the torch and the connection system 3, a flange 7 is provided and intended to fix the torch (as shown in FIG. 2) in the wall of an oven, only one portion 2 projecting inside the oven.

In accordance with the invention, the tubular portion 2 of the torch or bare torch, except for the nose 4, is surrounded by a sheath 8 and formed by two concentric casings and traversed by a cooling fluid, in this case the cooling water of the torch 1 and introduced by a flexible pipe 9 connected to the outlet 6 by a flexible pipe which itself is connected to the torch cooling water feed circuit (not shown).

More specifically, as illustrated the FIG. 2, the sheath 8 comprises a cylindrical internal casing Ba coaxial to the tubular portion 2 of the torch and disposed an extremely short distance away from the latter, for example 1 millimeter, and an outer casing 8*b* possibly cylindrical, coaxial to the casing 8*a*. The casings 8*a*, 8*b* collectively define an annular space several millimeters in thickness, a dozen millimeters for example.

At the distal extremity of the sheath 8, that is on the nose side 4 of the torch, said annular space is sealed off by an annular extremity flange 11, whereas the gap between the torch 1 and the sheath 8 at said extremity is sealed off by a suitable fibrous material 12, such as rock wool, and ensures imperviousness, that is avoiding in particular any dust entering the gap between the torch and the sheath.

At its proximal extremity, the sheath 8 is fitted with a fixing flange 13 able to be inserted between the flange 7 of the torch and the wall 14 of the oven, the torch 1/sheath 8 unit being engaged in a passage opening 15 fitted in said wall 14.

The flange 13 is disposed so as to receive the fixing elements of the torch/sheath unit on the wall 14 and ensure the passage of the cooling fluid of the sheath. For example, in FIG. 2, a fluid intake passage is shown at 16.

Figure 3:
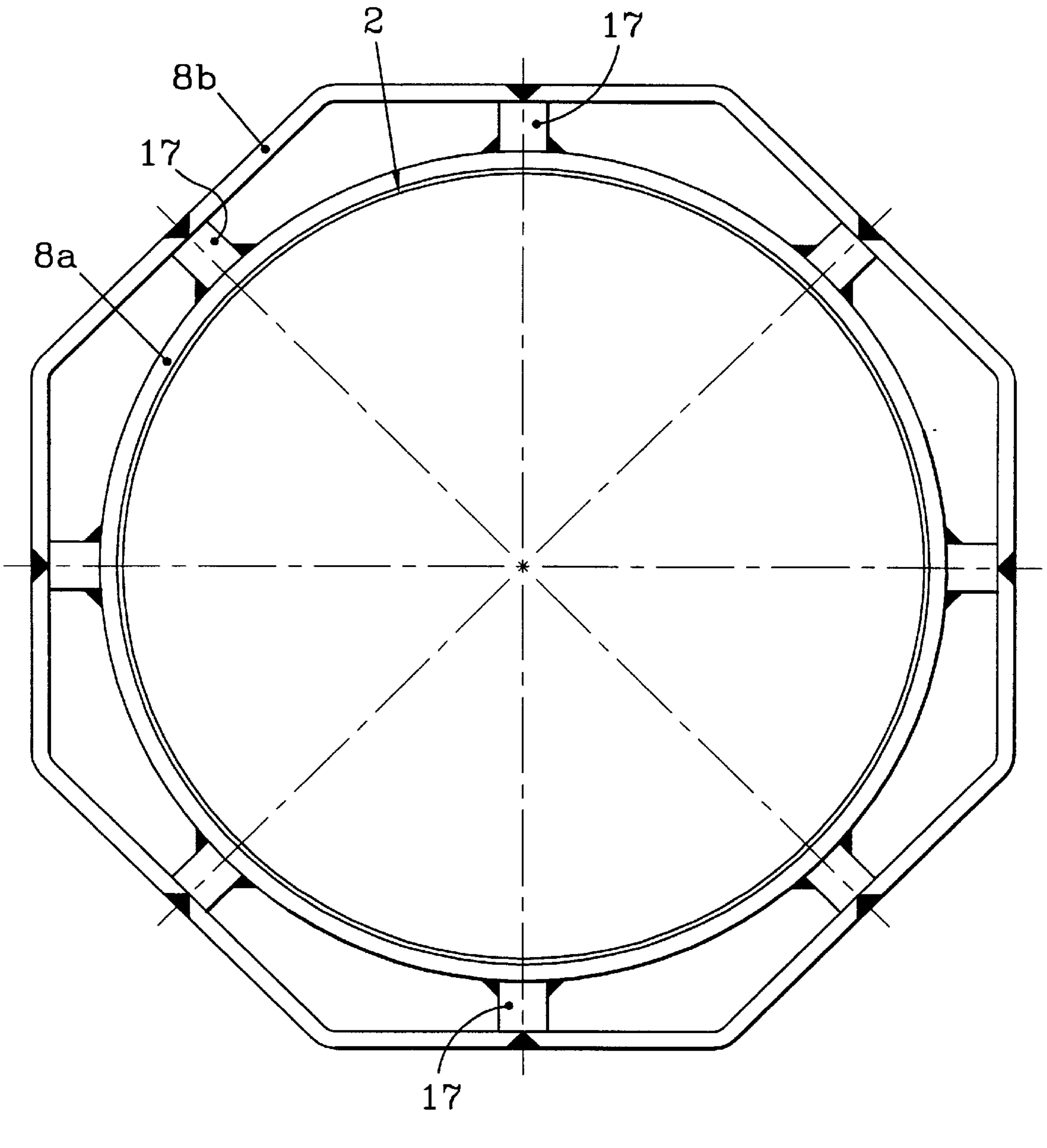
FIG. 3 is a cross-sectional view of a sheath according to the invention and with a cylindrical internal casing and a polygonal-shaped external casing.
Figure 4:
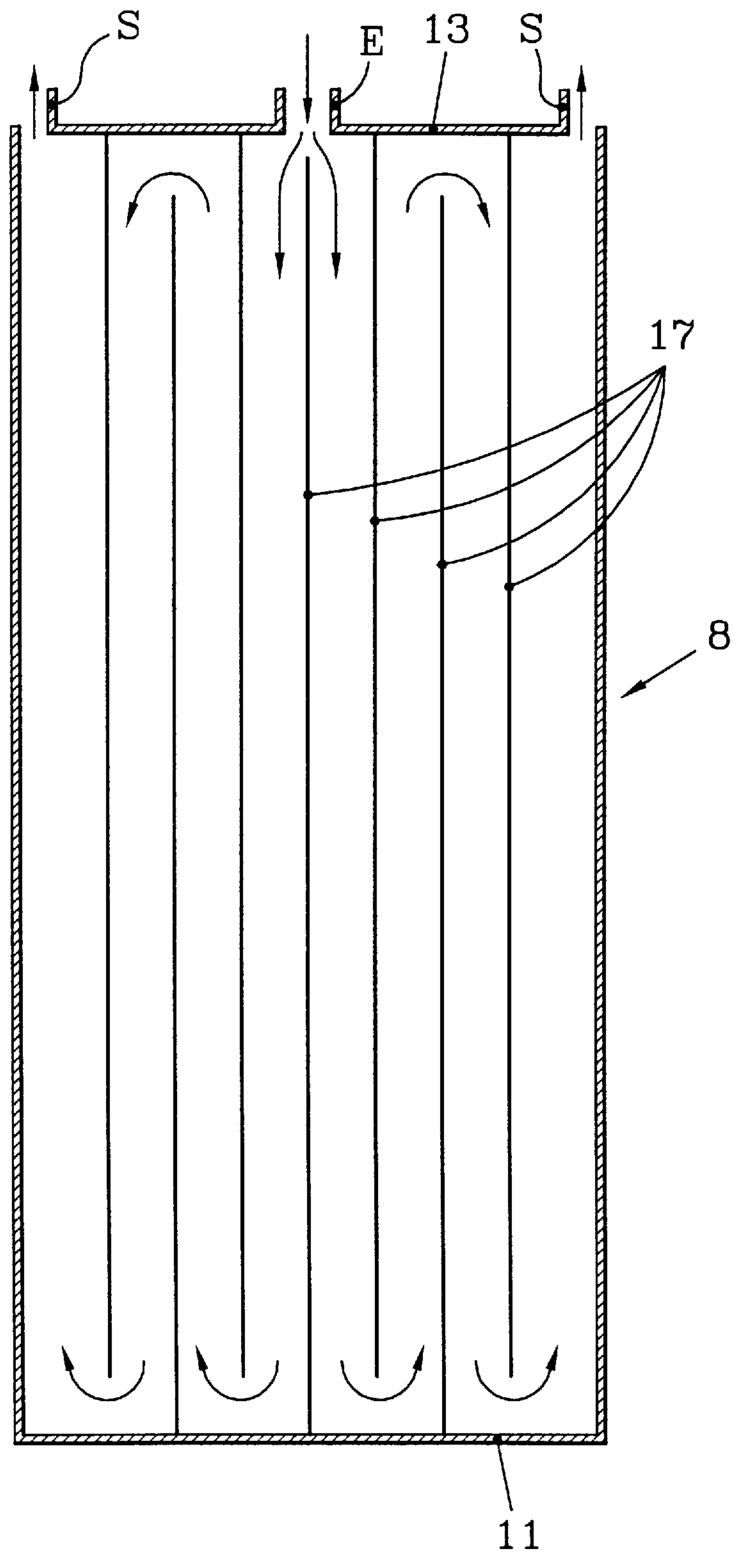
FIG. 4 is a diagram showing a mode for circulation of the cooling fluid inside the sheath.

Reference shall now be made to FIGS. 3 and 4 so as to describe an embodiment of the internal cooling circuit of the sheath 8.

As shown in FIG. 3 and according to one embodiment, the external casing 8*b* of the sheath is octagonal. Between the two casings 8*a*, 8*b* disposed along the longitudinal axis of the faces of the octagonal casing 8*b*, braces or spacers 17 (not shown in FIG. 2) define a cooling fluid a path constituted by return elements parallel to the axis of the sheath.

FIG. 4 shows a flat view of the routing of the fluid solely from a single inlet E to a single outlet S and diametrically opposite the inlet at the proximal extremity of the sheath 8.

The braces 17, alternately fixed at one of their extremities to the distal flange 11 and the proximal flange 13, form a network of baffles dividing the inlet flow into two symmetrical parts joining together at the outlet S, each part covering a half-sheath.

The embodiment in an octagonal form of the outer casing 8*b* is mainly dictated by embodiment facilities.

The material of the sheath 8 may be stainless steel.

Figure 5:
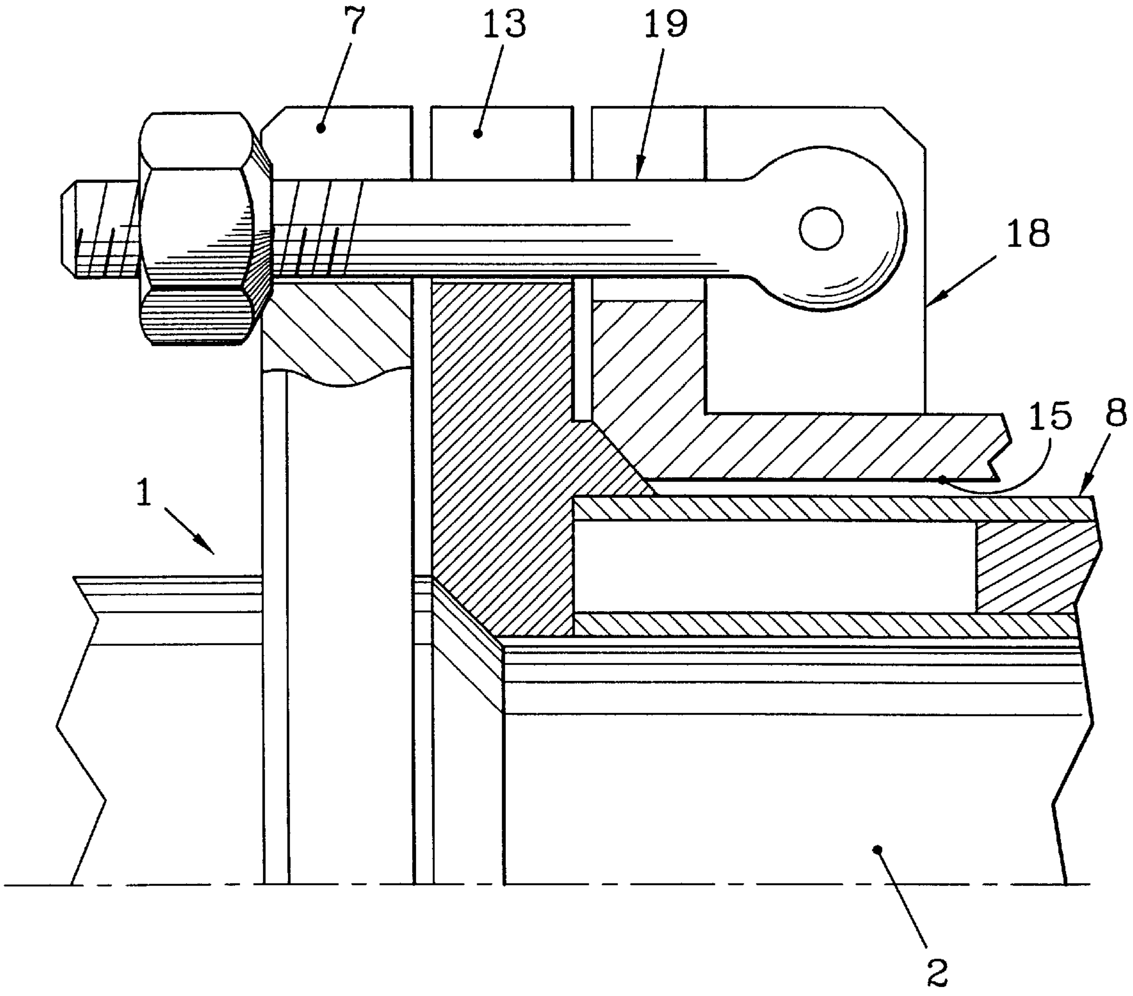
FIG. 5 is a partial sectional view of the proximal extremity of the sheath with its fixing flange.

FIG. 5 shows in more detail a flanging mode of the torch 1/sheath 8 unit on the fixed structure of the oven whose sole element shown is the element 18 defining the opening 15 for introducing into the oven the tubular portion 2 of the torch and bearing mounting elements 19, for instance four elements, angularly offset by 90°.

The flange 13 of the sheath 8 is inserted between the flange 7 of the torch 1 and the fixing element 18.

Figure 6:
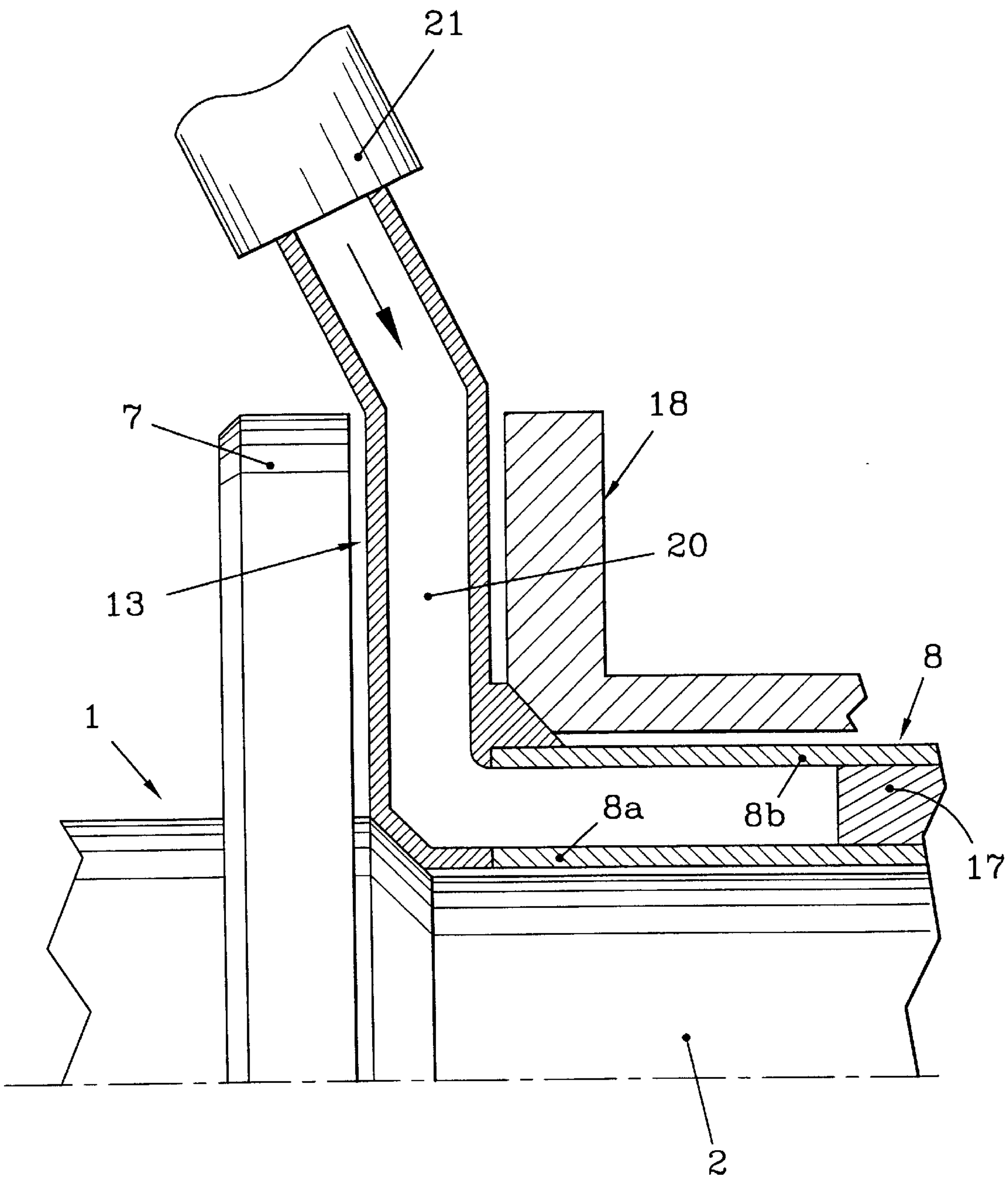
FIG. 6 is a view of said proximal extremity of the sheath at the level of the cooling fluid inlet.

Disposed at two diametrically opposing locations of the flange 13 are two radial passages 20 (FIG. 6) for circulation of the cooling fluid of the sheath 8. These two passages 20 communicate with the space between the casings 8*a*–8*b* and ensure the arrival and departure of, for example, water originating from the outlet 6 (FIG. 1) of the cooling circuit of the torch 1 via the pipe 9 and a connector 21.

The placing of the sheath 8, which is totally independant of the torch 1, is particularly quick and simple.

It merely suffices to engage it onto the tubular portion 2 of the torch and engage the unit in the opening 15 and then place the elements 19, the flanges 7, 13/connection system 3 unit remaining outside the oven.

A gap is provided between the sheath 8 and the bare torch 2 so as to facilitate the placing ot the sheath and permit thermal expansion clearances, this gap shall of course be as small as possible.

The recirculation in the sheath 8 of the water used to cool the torch is possible as a high flow is available required by cooling of the upstream electrode so that the rise in temperature of the water during passage into the torch is slight, that is about ten degrees, thus enabling it to be reused as a cooling agent.

The system of baffles (17) in the space between the casings 8*a*, 8*b* has nevertheless been designed so as to obtain a cooling fluid circulation speed approximately constant inside the sheath and corresponding to the cooling flow required for the torch, the optimum flow corresponding to a circulation speed between 3 and 4 m/s.

Of course, the water or any other fluid intended for the sheath 8 may be derived from an independant source with a suitable pressure and flowrate.

The inlet and outlet of the circuit of the sheath 8 may also be connected in parallel with the torch 1 to a common source.

The length of the bare torch introduced into the oven may be easily adjusted by inserting suitable braces between the flanges 7, 13 and the fixed mounting device 18.

The invention is clearly applicable to types of plasma torches differing from the one shown on FIG. 1, especially bare torches not having any cooling circuit inserted between the tubular casing and the downstream electrode in which the sheath 8 extends over the entire length of said bare torch, as well as transferred arc torches.

Finally, the invention is clearly not limited to the embodiments shown and described as above, but on the contrary covers all possible variants (especially as regards the shape of the internal 8*a* and external 8*b* casings), the disposition of the internal baffle system 17, the links between the inside of the sheath and the outer cooling fluid intake and evacuation circuits, as well as the means for rendering integral the sheath to the structure (18) of the traversed wall 14 and/or to the torch 1.

With this external cooling device, the torch 1 is capable, even with its bare torch portion being completely inserted in a vitrification oven, of withstanding temperatures exceeding 1600° C. and sometimes reaching 2000° C. without getting damaged.

We claim:

1. External cooling system for cooling a plasma torch in which at least one electrode and plasma fluid and cooling circuits are housed in a tubular casing, said external cooling system having a construction adapted to allow the torch to be introduced into an opening of an oven through the external cooling system, wherein the external cooling system comprises:

a fixing device for surrounding the opening of the oven, the fixing device being adapted to cooperate with a flange of the torch;

an independent sheath for surrounding at least one portion of said tubular casting, the independent sheath being formed by an internal concentric casing and an external concentric casing, the independent sheath comprising at a proximal extremity a flange adapted to cooperate with the fixing device, the independent sheath being provided with passages for cooling fluid to enter and leave the independent sheath;

at least one cooling fluid inlet and at least one outlet, both the at least one inlet and the at least one outlet being disposed at a proximal extremity of said independent sheath, the at least one inlet and the at least one outlet being connected to a cooling fluid source; and a system of baffles being disposed between the two casings of the independent sheath so as to constitute between the inlet and outlet a cooling circuit substantially covering the entire surface of the independent sheath.

2. External cooling system according to claim 1, wherein at least one of the at least one inlet of the cooling fluid in the independent sheath is connected to an outlet of the cooling fluid from the torch, the at least one outlet of the independent sheath being connected to an external system for regenerating the cooling fluid of the torch.

3. Eternal cooling system according to claim 1, wherein the system of baffles between the two concentric casings of the independent sheath is constituted by internal spacer partitions parallel to the as of the independent sheath so as to define for the cooling fluid a path including a plurality of return elements parallel to said axis, the return elements being over the entire length of the independent sheath.

4. External cooling system according to claim 3, wherein the at least one inlet and the at least one outlet of the cooling fluid are disposed opposite each other and the circuit of the cooling fluid is divided into two symmetrical portions each covering a half-sheath.

5. External cooling system according to claim 1 wherein said independent sheath is provided at a distal extremity with a gasket impervious to dust, the gasket being capable of being inserted between the internal concentric casing and the torch.

6. A plasma torch system comprising:

an oven having an opening in a wall;

a fixing device adjacent to the opening of the oven wall;

a plasma torch comprising:

at least one electrode;

a system for routing plasma to said at least one electrode;

a tubular casing having a flange capable of cooperative with the fixing device, said at least one electrode and said system for routing plasma to said at least one electrode being housed in said tubule casing; and an external cooling device comprising:

an independent sheath capable of surrounding at least a main portion of said tubular casing, said independent sheath comprising two concentric casings;

at least one cooling fluid inlet and at least one cooling fluid outlet, said inlet and said outlet being positioned proximate to an extremity of said independent sheath and being connected to a source of cooling fluid; and a cooling fluid circuit extending between said two concentric casings of said independent sheath for directing said cooling fluid from said inlet to said outlet.

7. A plasma torch system according to claim 6, wherein said cooling fluid circuit comprising a system of baffles is positioned between said two concentric casings of the independent sheath so as to direct said cooling fluid from said inlet to said outlet to substantially cover the entire surface of the independent sheath.

8. A plasma torch system according to claim 7, wherein the system of baffles between the two concentric casings of the independent sheath involves internal spacer partitions which are parallel to the axis of the independent sheath so as to define for the cooling fluid a path including a plurality of return elements parallel to said axis, the return elements covering substantially the entire length of the independent sheath.

9. A plasma torch system according to claim 8, wherein the inlet and outlet of the cooling fluid are disposed opposite each other and the circuit of the fluid is divided into two symmetrical portions each covering a half of the independent sheath.

10. A plasma torch according to claim 6, wherein said inlet and outlet are connected to a cooling fluid source.

11. A plasma torch system according to claim 6, wherein a length of the torch introduced into the oven is adjustable.

12. A plasma torch system according to claim 6, wherein said independent sheath further comprises at an end a flange which is also capable of cooperating with said fixing device, the independent sheath being provided with passages to allow cooling fluid to enter and leave the independent sheath.

13. A plasma torch system according to claim 7, wherein at least one of the at least one inlet of the cooling fluid of the independent sheath is connected to an outlet of the cooling fluid from the torch, and wherein the outlet of the independent sheath is connected to an external system for renewing the cooling fluid.

14. A plasma torch system according to claim 6, wherein said independent sheath has at an end a gasket which is impervious to dust and which is inserted between the internal concentric casing and the tubular casing of the torch.

15. A plasma torch system according to claim 14, wherein the gasket spaces the internal concentric casing from the tubular casing of the torch.

16. A plasma torch system according to claim 15, wherein the gasket spaces the internal concentric casing about 1 millimeter from the tubular casing of the torch.

17. A plasma torch system according to claim 6, wherein when the independent sheath surrounds the portion of the tubular casing, the internal concentric casing is spaced from the tubular casing.

18. A plasma torch system according to claim 17, wherein the internal concentric casing is spaced about 1 millimeter from the tubular casing.

19. A plasma torch system according to claim 6, further comprising a fixing device for fixing the plasma torch with respect to the external cooling device and for enabling detachment of the plasma torch from the external cooling device.

* * * * *